(12) United States Patent
Heyes et al.

(10) Patent No.: US 6,948,913 B2
(45) Date of Patent: Sep. 27, 2005

(54) TURBOCHARGERS

(75) Inventors: Francis Joseph Geoffrey Heyes, Lincoln (GB); Ian Patrick Clare Brown, Beeston (GB)

(73) Assignee: Demag Delaval Industrial Turbomachinery Limited, Middlesex (GB)

( * ) Notice: Subject to any disclaimer, the term of this patent is extended or adjusted under 35 U.S.C. 154(b) by 208 days.

(21) Appl. No.: 10/647,015

(22) Filed: Aug. 22, 2003

(65) Prior Publication Data

US 2005/0169764 A1 Aug. 4, 2005

(30) Foreign Application Priority Data

Aug. 24, 2002 (GB) .................................. 0219804

(51) Int. Cl.⁷ ............................................ F04D 29/20
(52) U.S. Cl. .............................. 416/204 R; 416/204 A; 416/244 R; 416/244 A
(58) Field of Search ........................... 416/204 A, 185, 416/182, 204 R, 244 R, 244 A, 213 R, 234

(56) References Cited

U.S. PATENT DOCUMENTS

| 3,019,039 A | * | 1/1962 | Clavell ........................ 403/30 |
| 4,518,315 A | | 5/1985 | Kruger |
| 2002/0001522 A1 | | 1/2002 | Mukherjee et al. |

* cited by examiner

*Primary Examiner*—Edward K. Look
*Assistant Examiner*—Dwayne J. White
(74) *Attorney, Agent, or Firm*—Kirschstein, et al.

(57) ABSTRACT

A turbocharger has a shaft formed of a strong material such as steel and an impeller formed of a relatively weaker material such as aluminum alloy. The impeller is mounted on the shaft by means of an internally-threaded insert, for example also of steel, interference fitted into the impeller hub. To prevent loss of the interference fit between the insert and impeller during thermal and speed excursions of the impeller during operation of the turbocharger, a constraining ring is fitted to the hub of the impeller. The ring is of a material having a lower coefficient of thermal expansion than the material of the impeller and surrounds at least a part of that axial length of the impeller which overlies the insert.

16 Claims, 2 Drawing Sheets

TURBOCHARGERS

FIELD OF THE INVENTION

This invention relates to turbochargers and to impellers for turbochargers.

BACKGROUND TO THE INVENTION

Turbocharger impellers are typically made of aluminum alloys to provide low rotational inertia with reasonable strength at a commercially acceptable cost. Attachment of the impeller to the steel turbocharger shaft is achieved in various ways, but because of the relative weakness of aluminum and the small diameter of the shaft, it is desirable to provide the impeller with a steel insert containing a screw-threaded socket which can be threaded onto the shaft. This arrangement can take a higher torque than a connection in which the shaft is directly threaded into the aluminum body (the torque is proportional to the power transmitted across the joint, and so the impeller can be used at a higher pressure ratio than one in which there is a direct threaded connection).

Typically, such an insert is fitted into the impeller by shrink fitting; the aluminum body of the impeller is heated to expand the bore which is to receive the steel insert, while the insert is cooled, for example using liquid nitrogen, before being inserted into the bore. The resultant interference connection is restricted by the temperature to which the aluminum can be heated before its material properties are affected, and by the temperature to which the steel can be cooled.

While the arrangement described can perform satisfactorily, a problem can arise during cycling of the turbocharger from rest to full load. As the turbocharger starts to spin, the joint is affected by centrifugal forces, whereby the aluminum grows outwards away from the steel insert. This reduces the interference force between the insert and the impeller, and due to design constraints it has been found that this reduction tends to be greater at one end of the insert than at the other. Consequently, the insert is gripped more firmly at one of its ends than at the other. The turbocharger then starts to heat up, and because of the different thermal coefficients of expansion of the aluminum alloy and the steel, the aluminum grows axially more than the steel, causing the two metals to slide over each other, except at the location where the impeller still grips the insert firmly. On shutdown, the centrifugal stresses are removed, but the thermal stresses remain for some minutes as the turbocharger cools. In this process, the point of grip of the impeller on the insert changes from one end to the other, and as the turbocharger cools, the insert "walks" along the impeller.

In certain very cyclic conditions (for example fast ferry applications in high ambient temperatures), it has been observed that the insert can move so far along the impeller that turbocharger failure can occur. Although the effect can be mitigated to some degree by increasing the original interference between the components, for the reasons mentioned above this solution is limited, and it is therefore desirable to achieve a design which ensures that the point of grip remains at the same location during the operating cycles, rather than shifting from one end of the insert to the other.

SUMMARY OF THE INVENTION

According to the invention, there is provided a turbocharger having an impeller, the impeller being formed of a first material and being mounted on a turbocharger shaft by means of an insert that is an interference fit in the impeller, the insert comprising a second material of greater strength than the first material, and a constraining ring comprising a material having greater strength and a lower coefficient of thermal expansion than the first material, the constraining ring surrounding at least a part of an axial length of the impeller that overlies the insert, thereby to maintain the interference between the insert and the impeller during use of the turbocharger over its operating speed and temperature range.

Preferably, the impeller is formed of aluminum alloy and the shaft, the insert and the ring are formed of suitable steels.

Since the ring does not expand as much as the impeller body as the turbocharger heats up, the point of grip between the impeller and the insert remains within the axial extent of the ring during the whole operating cycle of the turbocharger, thereby preventing the tendency of the impeller to "walk" along the insert. As a consequence, the operating life of the turbocharger can be considerably extended in comparison with the conventional turbocharger without the constraining ring.

The constraining ring can be fitted onto the impeller body by heating the ring to permit it to be slid onto a circular land, which may be in the form of a step on the impeller hub. Cooling then causes the ring to grip the hub. However, it is not necessary for the ring to exert a high compressive force on the impeller body; its function is to constrain expansion of the impeller relative to the insert, due either to the effects of centrifugal stresses or to thermal expansion. Indeed, it is possible for the ring to have a slight clearance on the assembly when in the cold state, exerting no significant grip. It would then be sufficient to warm the ring to allow it to slip over the impeller more easily on assembly.

It has been found that an additional benefit of the use of the constraining ring is that the torque transmitting capability of the joint is increased. This has a major benefit to the rotating assembly, especially if the design is to be used in a mini turbine, where strong fault torques may be transmitted through the rotor shaft.

The invention also provides an impeller for a turbocharger, comprising a hub of a first material and an insert that is an interference fit in the hub for receipt of a shaft of the turbocharger, the insert comprising a second material of greater strength than the first material, the hub having mounted thereon a constraining ring of a material having greater strength and a lower coefficient of thermal expansion than the first material, the ring surrounding at least a part of an axial length of the impeller that overlies the insert, thereby to maintain the interference between the insert and the impeller during use of the turbocharger over its operating speed and temperature range.

Further aspects of the invention will be apparent from a perusal of the following specific description and the accompanying claims.

BRIEF DESCRIPTION OF THE DRAWINGS

In the drawings, which illustrate exemplary embodiments of the invention.

DETAILED DESCRIPTION OF THE ILLUSTRATED EMBODIMENTS

Figure 1:
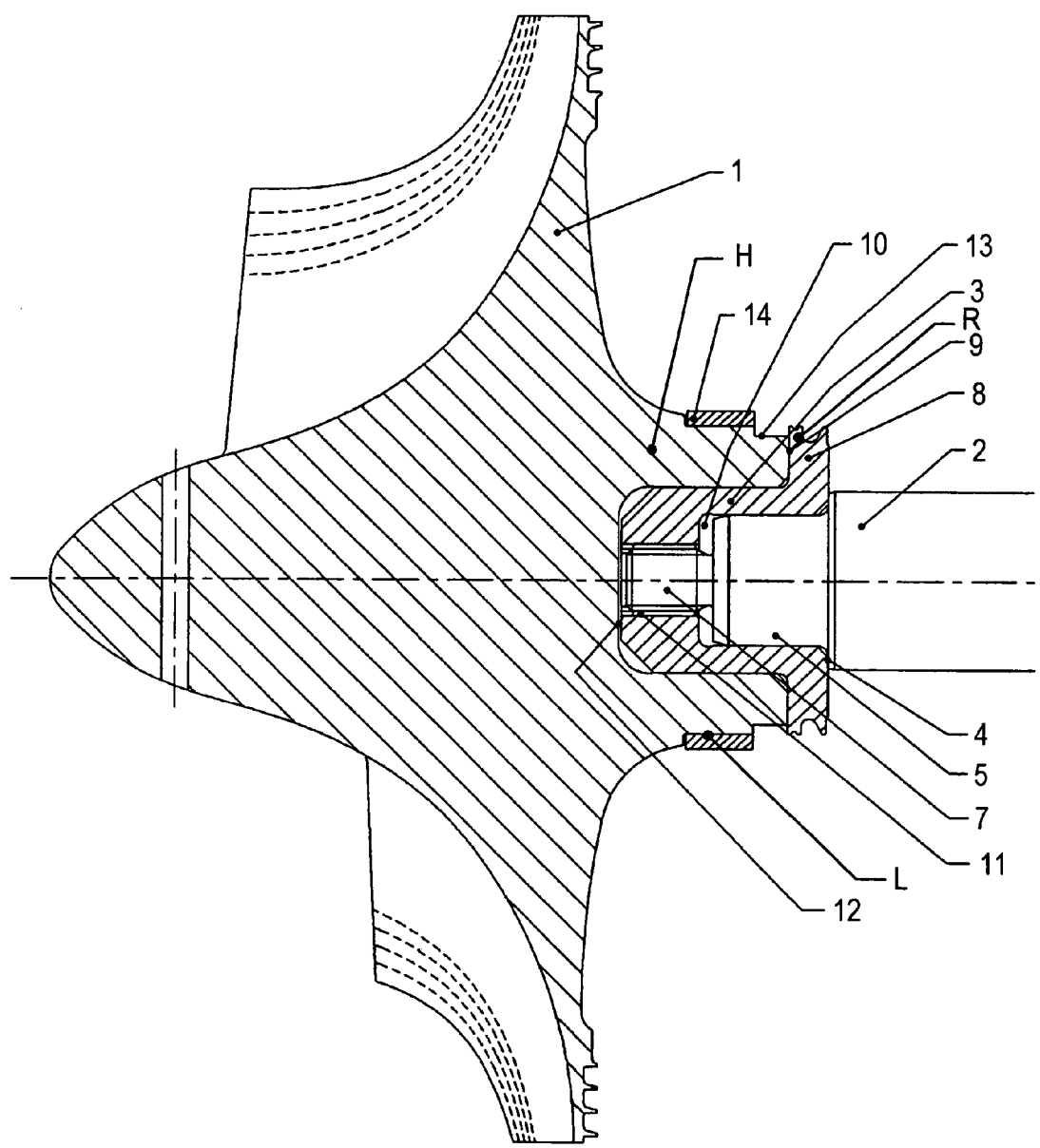
FIG. 1 is a sectional elevation through a turbocharger impeller in accordance with the invention.

Referring first to FIG. 1, an aluminum alloy impeller 1 is fitted onto a steel turbocharger shaft 2 by means of a steel insert 3. The alloy of which the impeller is made (known in the United States by the designation "2618A") has a relatively high strength for use up to a temperature of about 200 degrees Celsius, having a composition of aluminum with about 2.5 wt. % copper and smaller amounts of magnesium, iron and nickel. The insert 3 may be made of a free-machining mild steel and is located in the central hub H of the body of impeller 1.

The shaft 2 is formed at its end with a first shoulder 4 surrounding a cylindrical locating portion 5, and a screw-threaded portion 7 of further reduced diameter extending from the end of the locating portion. The steel insert 3 is of generally cup-like shape, having a flange 8 around its mouth engaging against the end face 9 of the impeller hub H and in turn being engaged on its other side by the shoulder 4 on the shaft 2. The locating portion 5 of the shaft is received in the main hollow part 10 of the insert in a close, but not tight, fit. A threaded bore 11 extends through the end face 12 of the insert and engages on the screw-threaded portion 7 of the shaft.

It will be noticed by those skilled in the art that the outer diameter of the insert's flange 8 is provided with an oil capture/thrower ring R, which in this embodiment of the invention is machined into the flange, rather than being a separate component. The oil capture/thrower ring part of the insert cooperates with a circumferential step or land 13 on the outer surface of the impeller hub H to form a groove which can receive a sealing ring (not shown) to provide a rotating oil and pressure seal between the impeller and a casing (not shown) of the turbocharger.

In accordance with the invention, FIG. 1 shows the addition of a constraining ring 14 around the hub H of the impeller body. The constraining ring is preferably made of a high tensile steel such as EN26, whose composition includes about 2.5 wt. % nickel. It is fitted on to the impeller 1 by heating the ring to cause it to expand, and then slipping it on to a circumferential step or land L of the impeller hub H where, on cooling, it grips the impeller in a position overlying and surrounding a portion of the connection interface between the insert and the impeller. It should be noted that the steel ring 14 has a lower coefficient of thermal expansion than the aluminum alloy impeller and hence does not expand as much with rising temperature as the hub H. This difference in their respective coefficients of expansion, combined with the previously described shrink-fitting of the insert 3, ensures that the grip between the impeller and the insert remains sufficient throughout the operating cycle of the turbocharger of which the impeller is a part to prevent relative movement between the impeller and insert under the influence of centrifugal and thermal stresses.

Figure 2:
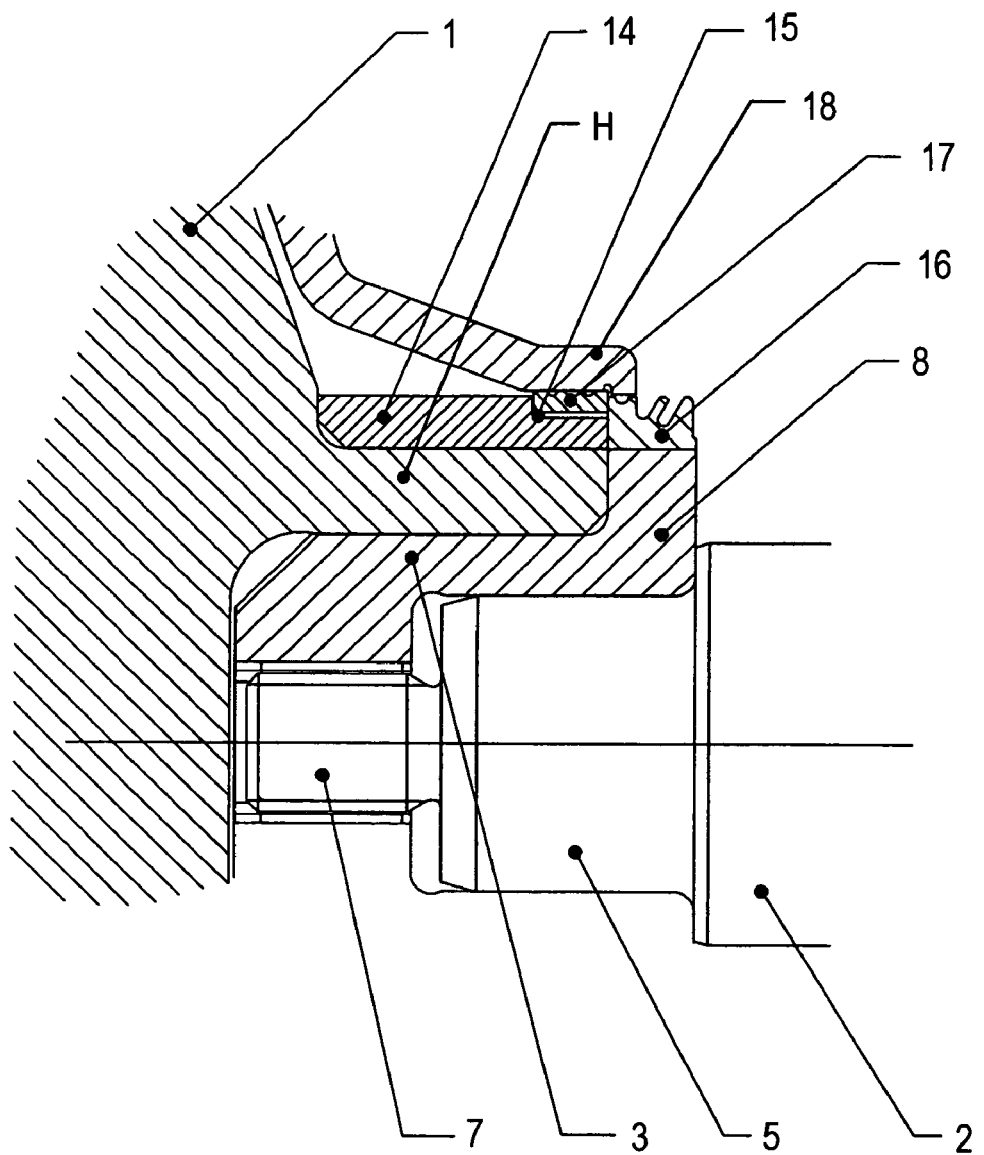
FIG. 2 is an enlarged sectional view of a part of the impeller with another form of constraining ring fitted.

FIG. 2 illustrates in enlarged partially sectional view a preferred embodiment of the turbocharger impeller, in which those components which are similar to those shown in FIG. 1 are given the same reference numerals and are not described again in detail. In this embodiment, the constraining ring 14 extends over most of the length of the interface connection between the insert 3 and the hub of the impeller 1, the hub here taking the form of a cylindrical sleeve. Embodiments are also possible in which the constraining ring 14 extends over the whole of the length of the interface between the insert and impeller. As also shown in FIG. 2, the constraining ring 14 is provided with a circumferential step 15 in its outer surface which, in conjunction with an oil capture/thrower ring 16 mounted as a separate component on the insert flange, defines a groove to receive and contain a sealing ring 17. This sealing ring 17 cooperates with static structure of the turbocharger in the form of an impeller casing 18 and serves to retain lubricating oil to the shaft side of the assembly (right hand in the FIG. 2) and compressed air to the impeller side of the assembly (left hand in the FIG. 2). The compressed air is contained between the body of the impeller 1, the constraining ring 14 with its seal ring 17, and the impeller casing 18, within which the impeller assembly is mounted for rotation on overhung bearings (not shown).

The impeller assembly is built up as follows. After the insert 3 has been fitted into the impeller, as previously described, the constraining ring 14 is slid onto the impeller at the desired position; it may be necessary to warm the ring first to facilitate this. When the impeller 1 is in the cold state at start-up of the turbocharger, the ring may be either an interference fit or a running fit on the impeller, provided it is effective to constrain outward expansion of the impeller under thermal and centrifugal stresses. In the FIG. 2 embodiment, the ring 14 does not need to exert any stresses on the impeller during a cold start in order to maintain the interference between the insert and the impeller during use of the turbocharger over its normal running speed and temperature range, and the ring can therefore be a sliding fit when cold.

However, in this case an abutment is required to prevent the ring moving along the hub to the right of the drawing during cold starts. This abutment is conveniently provided on the insert 3 by shrink-fitting the oil capture/thrower ring 16 onto the flange 8 of the insert 3 adjacent the constraining ring 14, after the latter has been fitted. The sealing ring 17 can be fitted on assembly of the shaft into the turbocharger, for example in the manner of piston rings in an internal combustion engine. Alternatively, the sealing ring 17 is fitted before the oil capture/thrower ring 16 is put in position.

It will be understood that each of the elements described above, or two or more together, also may find a useful application in other types of constructions differing from the types described above.

While the invention has been illustrated and described as embodied in turbomachinery it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A turbocharger having an impeller, the impeller being formed of a first material and being mounted on a turbocharger shaft by means of an insert that is an interference fit in the impeller, the insert comprising a second material of greater strength than the first material, and a constraining ring comprising a material having greater strength and a lower coefficient of thermal expansion than the first material, the constraining ring surrounding at least a part of an axial length of the impeller that overlies the insert, thereby to maintain the interference between the insert and the impeller during use of the turbocharger over its operating speed and temperature range.

2. The turbocharger according to claim 1, wherein the impeller is formed of aluminum alloy and wherein the shaft, the insert and the ring are formed of steel.

3. The turbocharger according to claim 2, wherein the insert comprises mild steel and the ring comprises high-tensile steel.

4. The turbocharger according to claim 1, wherein the constraining ring extends over at least most of the length of an interface connection between the insert and the impeller.

5. The turbocharger according to claim 1, wherein an abutment is provided on the insert to prevent axial movement of the constraining ring on a hub of the impeller when the impeller assembly is cold.

6. The turbocharger according to claim 1, wherein the constraining ring is provided with a circumferential land in its outer surface and a sealing ring is located thereon to cooperate with static structure of the turbocharger.

7. The turbocharger according to claim 5, wherein an oil thrower ring on a flange of the insert cooperates with the land to define a groove to contain the sealing ring.

8. The turbocharger according to claim 7, wherein the oil thrower ring serves to prevent axial movement of the constraining ring when the impeller assembly is cold.

9. An impeller for a turbocharger, comprising a hub of a first material and an insert that is an interference fit in the hub for receipt of a shaft of the turbocharger, the insert comprising a second material of greater strength than the first material, the hub having mounted thereon a constraining ring of a material having greater strength and a lower coefficient of thermal expansion than the first material, the ring surrounding at least a part of an axial length of the impeller that overlies the insert, thereby to maintain the interference between the insert and the impeller during use of the turbocharger over its operating speed and temperature range.

10. The impeller according to claim 9, wherein the impeller has a body formed of an aluminum alloy and wherein the insert and the ring are formed of steel.

11. The impeller according to claim 10, wherein the insert comprises mild steel and the ring comprises high-tensile steel.

12. The impeller according to claim 9, wherein the constraining ring extends over at least most of the length of an interface connection between the insert and the impeller.

13. The impeller according to claim 9, wherein an abutment is provided on the insert to prevent axial movement of the constraining ring on the impeller hub when the impeller assembly is cold.

14. The impeller according to claim 9, wherein the constraining ring is provided with a circumferential land in its outer surface and a sealing ring is located thereon to cooperate with static structure of the turbocharger.

15. The impeller according to claim 14, wherein an oil thrower ring on a flange of the insert cooperates with the land to define a groove to contain the sealing ring.

16. The impeller according to claim 15, wherein the oil thrower ring provides an abutment to prevent axial movement of the constraining ring when the impeller assembly is cold.

* * * * *